(12) United States Patent
Kuroki et al.

(10) Patent No.: US 11,682,419 B2
(45) Date of Patent: Jun. 20, 2023

(54) MAGNETIC HEAD WITH ASSISTED MAGNETIC RECORDING

(71) Applicant: Western Digital Technologies, Inc., San Jose, CA (US)

(72) Inventors: Kenji Kuroki, Fujisawa (JP); Oscar Ruiz, San Jose, CA (US); Cherngye Hwang, San Jose, CA (US); Eduardo Torres Mireles, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/401,846

(22) Filed: Aug. 13, 2021

(65) Prior Publication Data
US 2023/0052309 A1    Feb. 16, 2023

(51) Int. Cl.
*G11B 5/31* (2006.01)
*G11B 5/008* (2006.01)

(52) U.S. Cl.
CPC ........ *G11B 5/3106* (2013.01); *G11B 5/00813* (2013.01)

(58) Field of Classification Search
CPC ................. G11B 5/3106; G11B 5/00813
See application file for complete search history.

(56) References Cited

U.S. PATENT DOCUMENTS

| | | | |
|---|---|---|---|
| 5,754,377 A * | 5/1998 | Gray | G11B 5/488 |
| 5,777,824 A * | 7/1998 | Gray | G11B 5/147 |
| 6,473,960 B1 * | 11/2002 | Schwartz | G11B 5/3106 |
| 6,956,718 B1 * | 10/2005 | Kulkarni | G11B 5/6082 |
| 7,916,424 B2 * | 3/2011 | Biskeborn | G11B 5/00826 360/122 |
| 8,611,044 B2 | 12/2013 | Biskeborn et al. | |
| 9,011,704 B2 | 4/2015 | Biskeborn et al. | |
| 9,153,259 B2 * | 10/2015 | Dee | G11B 5/84 |
| 9,711,170 B1 | 7/2017 | Biskeborn et al. | |
| 9,741,381 B1 * | 8/2017 | Zhao | G11B 5/3106 |
| 9,837,107 B2 * | 12/2017 | Biskeborn | G11B 5/00813 |
| 9,892,746 B1 * | 2/2018 | Zheng | H01L 21/31 |
| 2001/0019464 A1 | 9/2001 | Poorman et al. | |
| 2004/0032696 A1 * | 2/2004 | Johnson | B82Y 10/00 |
| 2005/0024779 A1 * | 2/2005 | Le | G11B 5/3106 |

(Continued)

OTHER PUBLICATIONS

Reuben Jueyuan Yeo, "Wear-Durable Protective Overcoats for Functional Tape Heads", Springer Singapore,, Ultrathin Carbon-Based Overcoats for Extremely High Density Magnetic Recording, Abstact.

*Primary Examiner* — Brian E Miller
(74) *Attorney, Agent, or Firm* — Patterson + Sheridan, LLP; Steven H. VerSteeg

(57) ABSTRACT

A magnetic recording head assembly is provided and is configured to read from and write to a magnetic media. The head assembly includes a first module having a first media facing surface (MFS), a first closure, and a first recessed portion disposed between the first MFS and the first closure. The first MFS includes AlTiC. A second module is provided having a second MFS, a second closure, and a second recessed portion disposed between the second MFS and the second closure. The second MFS includes AlTiC. An overcoat disposed within the first and second recessed portions includes an adhesive layer and a protective layer disposed within the first and second recessed portion.

22 Claims, 8 Drawing Sheets

(56) References Cited

U.S. PATENT DOCUMENTS

| | | | | |
|---|---|---|---|---|
| 2008/0266711 A1* | 10/2008 | Nibarger | ............ | G11B 5/00821 |
| | | | | 360/130.21 |
| 2008/0278854 A1* | 11/2008 | Biskeborn | ............ | G11B 5/3106 |
| 2010/0047628 A1* | 2/2010 | Biskeborn | .......... | G11B 5/00826 |
| | | | | 428/810 |
| 2010/0149685 A1 | 6/2010 | Yari et al. | | |
| 2010/0302683 A1* | 12/2010 | Yamada | ................... | G11B 5/40 |
| | | | | 360/235.1 |
| 2010/0302685 A1* | 12/2010 | Yamada | ............... | G11B 5/3106 |
| | | | | 360/246.2 |
| 2012/0106003 A1* | 5/2012 | Biskeborn | ................ | G11B 5/60 |
| | | | | 360/128 |
| 2012/0307396 A1* | 12/2012 | Biskeborn | .......... | G11B 5/00821 |
| | | | | 360/75 |
| 2014/0153136 A1* | 6/2014 | Flint | .................... | G11B 5/6082 |
| | | | | 216/22 |
| 2015/0138673 A1* | 5/2015 | Adrong | ................ | G11B 5/3106 |
| | | | | 427/127 |
| 2016/0180871 A1 | 6/2016 | Brong et al. | | |
| 2016/0267926 A1* | 9/2016 | Li | ........................ | G11B 5/3106 |
| 2019/0180773 A1* | 6/2019 | Biskeborn | .............. | G11B 15/62 |
| 2019/0180779 A1* | 6/2019 | Biskeborn | ............ | G11B 5/3146 |
| 2020/0020354 A1 | 1/2020 | Biskeborn et al. | | |
| 2020/0273491 A1* | 8/2020 | Biskeborn | .............. | G11B 5/235 |
| 2023/0052309 A1* | 2/2023 | Kuroki | ............... | G11B 5/00813 |

\* cited by examiner

MAGNETIC HEAD WITH ASSISTED MAGNETIC RECORDING

BACKGROUND OF THE DISCLOSURE

Field of the Disclosure

Embodiments of the present disclosure generally relate to a head assembly of a data storage device.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is linear tape open (LTO), which comes in a variety of densities.

Tape drives operate by using a tape head (i.e., magnetic recording head) to record and read back information from tapes by magnetic processes. The tape head comprises servo elements and data elements that are arranged in an array that is oftentimes referred to as a tape head array. Tape drives also have sensors as well as motors.

In operation, the tape drive system has many moving parts such as a tape (e.g., magnetic media) that moves between two reels. In between the two reels, the tape rolls over numerous rollers guiding the tape to a reading or writing position in front of the head. When the tape comes into contact with the tape head, the tape may experience contact stress that may result in the wear and tear of the tape, resulting in decreased lifespan and lower reliability.

Thus, there is a need in the art for an improved tape drive system that reduces the wear and tear of the tape.

SUMMARY OF THE DISCLOSURE

The present disclosure generally relates to a head assembly of a data storage device. The data storage device may include magnetic media embedded in the device or magnetic media from an insertable cassette or cartridge (e.g., in an LTO drive), where the magnetic head assembly reads from and writes to the magnetic media. During drive operation, the magnetic media moves across the magnetic head assembly. The magnetic head assembly is spaced a distance from the magnetic media such that some contact recording occurs between the magnetic head assembly and the magnetic media caused by the surface roughness of the head and the media. The contact reduces the magnetic spacing. The magnetic head assembly includes a closure, a media facing surface, and an array of transducers disposed within a recessed portion of the magnetic head. The recessed portion further includes an overcoat disposed adjacent to the array of transducers to achieve high recording density with low magnetic spacing. As used herein, "magnetic spacing" refers to the spacing between the read and write elements of the recording head and a top of a magnetic recording layer of the tapes. In some aspects, the recording head with the overcoat includes high head/tape interface (HTI) reliability by reducing a closure height with constant spacing. As used herein, the term "closure height variation" refers to the height offset between the closure and the substrate.

In one embodiment, a magnetic recording head assembly is provided and is configured to read from and write to a magnetic media. The head assembly includes a first module having a first media facing surface (MFS), a first closure, and a first recessed portion disposed between the first MFS and the first closure. The first MFS includes AlTiC. A second module is provided having a second MFS, a second closure, and a second recessed portion disposed between the second MFS and the second closure. The second MFS includes AlTiC. An overcoat includes an adhesive layer and a protective layer disposed within the first and second recessed portion.

In another embodiment, a magnetic recording head assembly is provided and configured to read from and write to a magnetic media. The head assembly includes a first module comprising a first head having a first media facing surface (MFS), a first closure, a first recessed portion disposed between the first MFS and the first closure, and a first array of transducers. A second module includes a second head having a second MFS, a second closure, a second recessed portion disposed between the second MFS and the second closure, and a second array of transducers. An overcoat including a metal is disposed within the first and second recessed portion.

In another embodiment, a data storage device is provided having a magnetic recording head assembly configured to read from and write to a magnetic media. The assembly includes a module comprising a media facing surface (MFS), a closure, a recessed portion disposed between the MFS and the closure, and an array of transducers. An overcoat is disposed within the recessed portion and adjacent to the array of transducers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

A magnetic recording head assembly is provided and is configured to read from and write to a magnetic media. The head assembly includes a first module having a first media facing surface (MFS), a first closure, and a first recessed portion disposed between the first MFS and the first closure. The first MFS includes AlTiC. A second module is provided having a second MFS, a second closure, and a second recessed portion disposed between the second MFS and the second closure. The second MFS includes AlTiC. An overcoat disposed within the first and second recessed portions includes an adhesive layer and a protective layer disposed within the first and second recessed portion.

Figure 1:
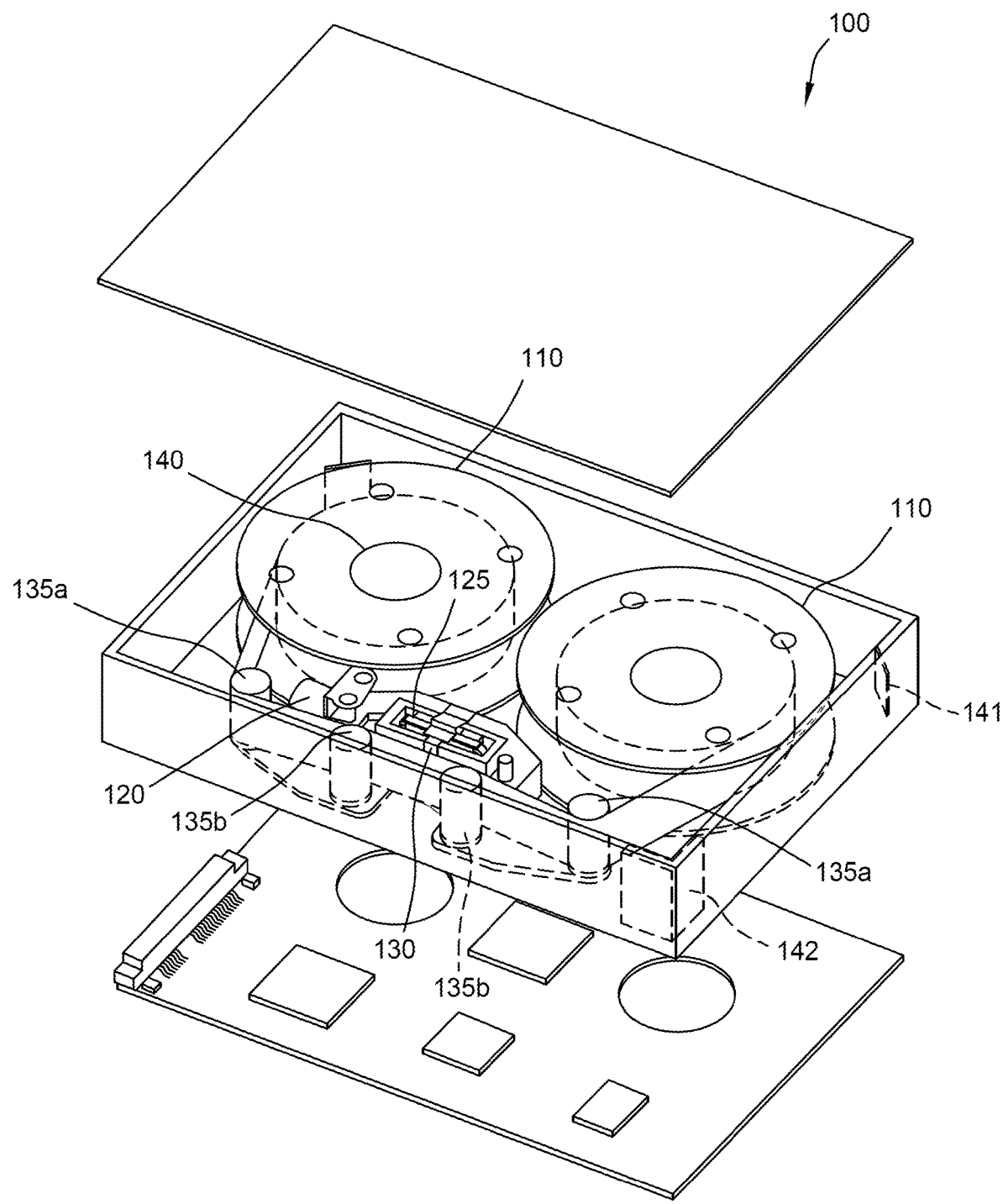
FIG. 1 is a schematic perspective exploded view of a storage device, according to one implementation.

FIG. 1 is a schematic perspective exploded view of a storage device 100, according to one implementation. The storage device 100 is a magnetic media drive. The storage device 100 will be referred to as the tape drive 100 hereafter. It is noted that while the tape drive is shown as having embedded tape for illustrative purposes, the embodiments of the present disclosure can be applied in various forms of tape drive including a drive where the tape media is insertable such as in a media cartridge. One example is tape drives and media conforming to the LTO standard, and the various drive illustrations shown would be similar to such a drive when the media is fully inserted and engageable for data access.

Figure 2:
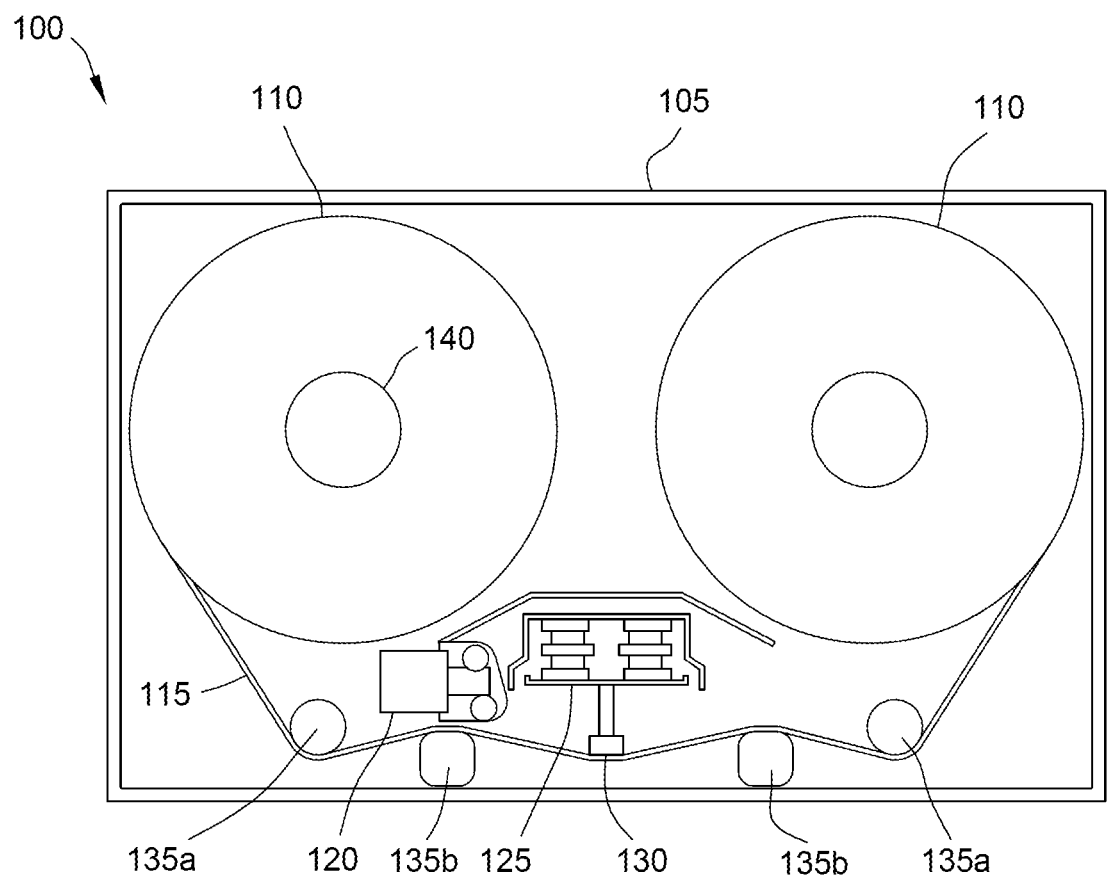
FIG. 2 is a schematic top-down view of the tape drive illustrated in FIG. 1, according to one implementation.

FIG. 2 is a schematic top-down view of the tape drive 100 illustrated in FIG. 1, according to one implementation.

Figure 3:
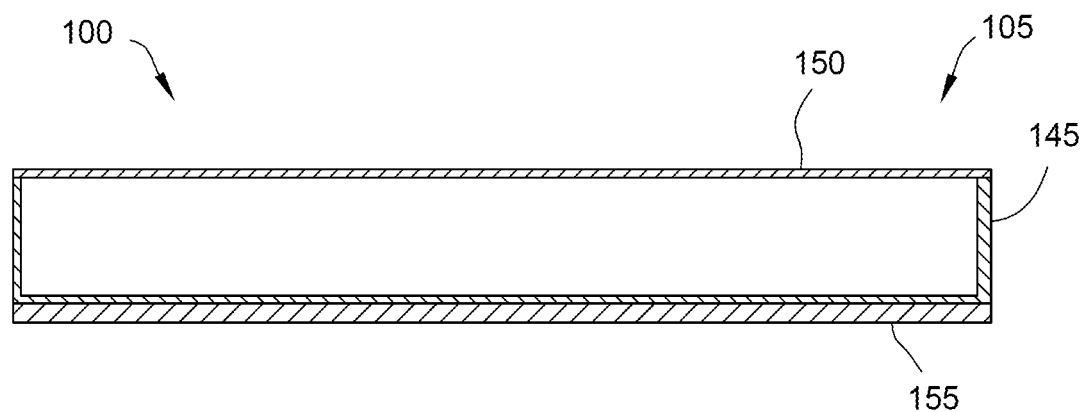
FIG. 3 is a schematic side profile view of the tape drive illustrated in FIG. 1, according to one implementation.

FIG. 3 is a schematic side profile view of the tape drive 100 illustrated in FIG. 1, according to one implementation.

Focusing on FIG. 2, for example, the tape drive 100 includes an enclosure that includes a casing 105, one or more tape reels 110, one or more rotors (e.g., a stepping motor 120 (also known as a stepper motor), a voice coil motor (VCM) 125, a head assembly 130 with one or more read heads and one or more write heads, and tape guides/rollers 135a, 135b. Focusing on FIG. 3, for example, the tape drive 100 also includes a printed circuit board assembly 155 (PCBA). In one embodiment, which can be combined with other embodiments, most of the components are within an interior cavity of the casing 105, except the PCBA 155, which is mounted on an external surface of the casing 105. The same components are illustrated in a perspective view in FIG. 1.

In the illustrated implementations, two tape reels 110 are placed in the interior cavity of the casing 105, with a center of each of the two tape reels 110 on the same level in the cavity. As shown in FIGS. 1 and 2, the head assembly 130 is located between and below the two tape reels 110. Tape reel motors located in the spindles of the tape reels 110 can operate to wind and unwind the tape media 115 into and out of the tape reels 110. Each tape reel 110 may also incorporate a tape folder to help the tape media 115 be neatly wound onto the respective tape reel 110. The tape media 115 may be made via a sputtering process to provide improved areal density. The tape media 115 includes two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

In one embodiment, which can be combined with other embodiments, the guides/rollers 135 utilize the same structure, as shown in FIG. 1. In one embodiment, which can be combined with other embodiments, the guides/rollers 135 may have more specialized shapes and differ from each other based on function, as shown in FIG. 2. A lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and the stepping motor 120 may variably position the tape head(s) transversely with respect to the width of the recording tape (e.g., the tape media 115). The stepping motor 120 may provide coarse movement, while the voice coil motor 125 may provide finer actuation of the head(s) of the head assembly 130. In one embodiment, which can be combined with other embodiments, servo data may be written to the tape media 115 to aid in more accurate position of the head(s) along the tape media 115.

The casing 105 includes one or more particle filters 141 and/or desiccants 142, as illustrated in FIG. 1, to help maintain the environment in the casing 105. For example, if the casing 105 is not airtight, the particle filters 141 may be placed where airflow is expected. The particle filters 141 and/or desiccants 142 may be placed in one or more of the corners or any other convenient place away from the moving internal components. For example, the moving tape reels 110 may generate internal airflow as the tape media 115 winds/unwinds, and the particle filters 141 may be placed within that airflow.

There is a wide variety of possible placements of the internal components of the tape drive 100 within the casing 105. In particular, as the head assembly 130 is internal to the casing 105 in certain examples, the tape media 115 may not be exposed to the outside of the casing 105. Thus, the tape media 115 does not need to be routed along the edge of the casing 105 and can be freely routed in more compact and/or otherwise more efficient ways within the casing 105. Similarly, the head(s) and tape reels 110 may be placed in a variety of locations to achieve a more efficient layout, as there are no design requirements to provide external access to these components.

As illustrated in FIG. 3, the casing 105 includes a cover 150 and a base 145. The PCBA 155 is attached to the bottom, on an external surface of the casing 105, opposite the cover 150. The base 145 includes three walls and the cover 150 includes a fourth wall to form four walls of a plurality of walls of the casing 105 that is included in the enclosure of the tape drive 100. As the PCBA 155 is made of solid state electronics, environmental issues are less of a concern, so it does not need to be placed inside the casing 105. That leaves room inside the casing 105 for other components, particularly, the moving components and the tape media 115 that would benefit from a more protected environment.

In one embodiment, which can be combined with other embodiments, the tape drive 100 is sealed. Sealing can mean the tape drive 100 is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, which can be combined with other embodiments, the cover 150 is used to hermetically seal the tape drive 100. For example, the tape drive 100 may be hermetically sealed for environmental control by attaching (e.g., laser welding, adhering using adhesive, etc.) the cover 150 to the base 145. The tape drive 100 may be filled by helium, nitrogen, hydrogen, or any other typically inert gas.

In one embodiment, which can be combined with other embodiments, other components may be added to the tape drive 100. For example, a pre-amp for the heads of the head assembly 130 may be added to the tape drive 100. The pre-amp may be located on the PCBA 155, in the head assembly 130, or in another location. In general, placing the pre-amp closer to the heads may have a greater effect on the read and write signals in terms of signal-to-noise ratio (SNR). In one embodiment, which can be combined with other embodiments, some of the components may be omitted. For example, the particle filters 141 and/or the desiccant 142 may be omitted.

Figure 4:
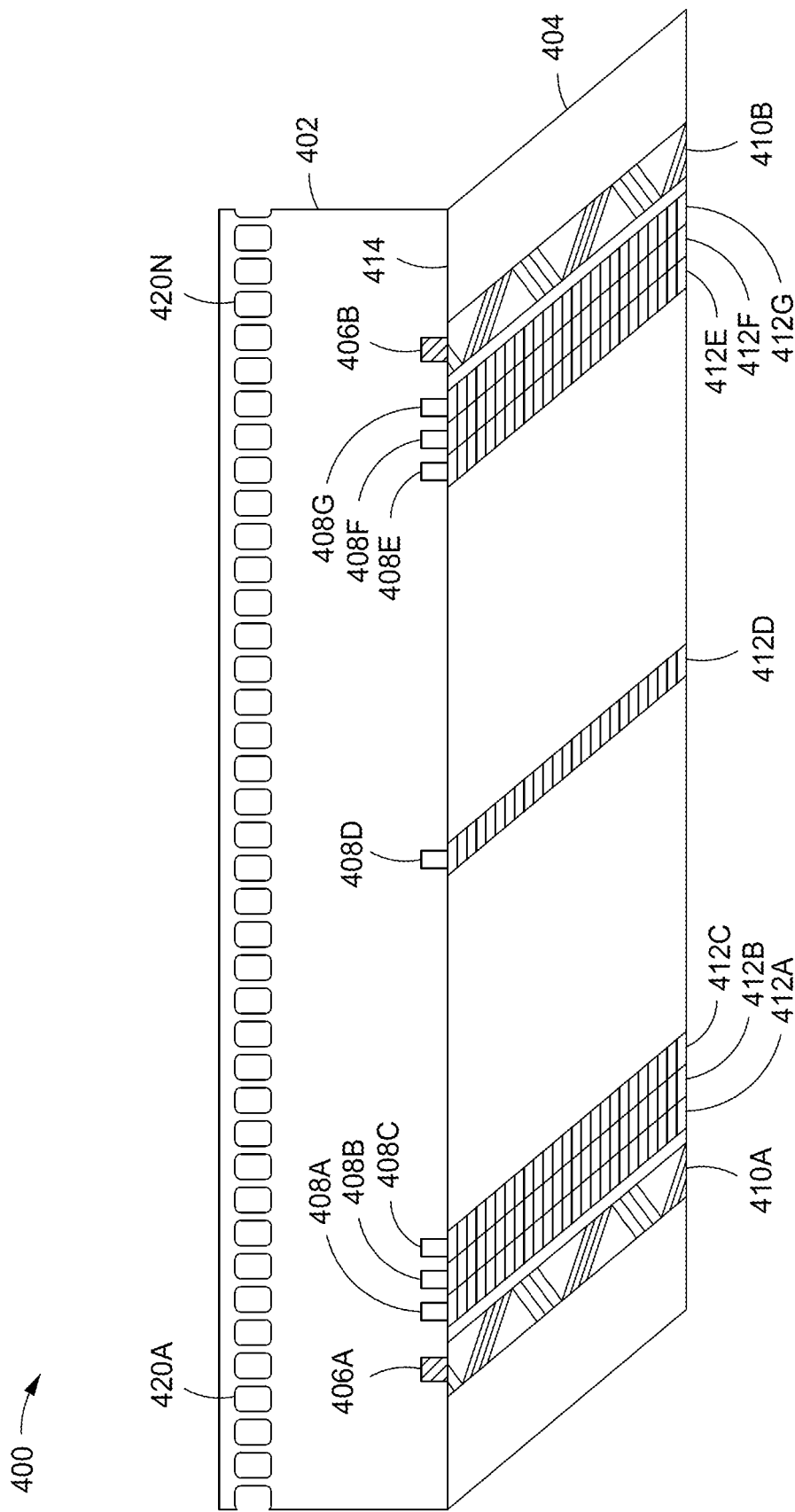
FIG. 4 is a schematic illustration of a tape head module and a tape that are aligned, according to one implementation.

FIG. 4 is a schematic illustration of a tape head module 400 and a tape 404 that are aligned. The tape head module 400 comprises a tape head body 402 that is aligned with the tape 404. The tape 404 moves past the tape head module 400 during read and/or write operations. The tape head module 400 has a media facing surface (MFS) 414 that faces the tape 404.

The tape head body 402 comprises a first servo head 406A and a second servo head 406B spaced therefrom. It is to be understood that while two servo heads have been shown, the disclosure is not limited to two servo heads. Rather, it is contemplated that more or less servo heads may be present. A plurality of data heads 408A-408G is disposed between the first servo head 406A and the second servo head 406B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 402.

A plurality of pads 420A-420N is electrically coupled to the data head body 402. The plurality of pads 420A-420N coupled to the data head body 402 is not limited to the number shown in FIG. 4. Rather, more or less pads are contemplated. The pads 420A-420N are used to connect the drive electronics to the servo heads 406A, 406B and to data read and writer elements. The pads 420A-420N are used to establish the potential across the servo reader by means of a power supply (not shown) embedded in the tape head 400.

The tape 404 comprises a first servo track 410A and a second servo track 410B. The first servo track 410A and the second servo track 410B are spaced apart allowing the tape head 400 to monitor and control the average position of the data heads 408A-408G relative to the data tracks 412A-412G on the tape 404. It is to be understood that while two servo tracks have been shown, the disclosure is not limited to two servo tracks. Rather, the number of servo tracks can be more or less than two, depending on the requirements of the embodiment.

The tape 404 further comprises a plurality of data tracks 412A-412G disposed between the first servo track 410A and the second servo track 410B. It is to be understood that while seven data tracks have been shown, the disclosure is not limited to the seven data tracks. Rather, the number of data tracks can be more or less than seven, depending on the requirements of the embodiment. In the embodiment of FIG. 4, the first servo head 406A reads its lateral position information (e.g., alignment) over the first servo track 410A. The second servo head 406B is aligned with the second servo track 410B. The combined information allows the servo actuator of the tape drive 400 to align the data heads 408A-408G such that the center data track (e.g., 408D) is centered on tape 404. The plurality of data heads 408A-408G is thus individually aligned with the plurality of data tracks 412A-412N for best case positioning. In this embodiment the first servo head 406A, the second servo head 406B, the first servo track 410A, the second servo track 410B, the plurality of data heads 408A-408G, and the plurality of data tracks 412A-412G are able to read and/or write the data accurately because all are aligned perpendicular to the direction of travel of the tape 404.

Figure 5:
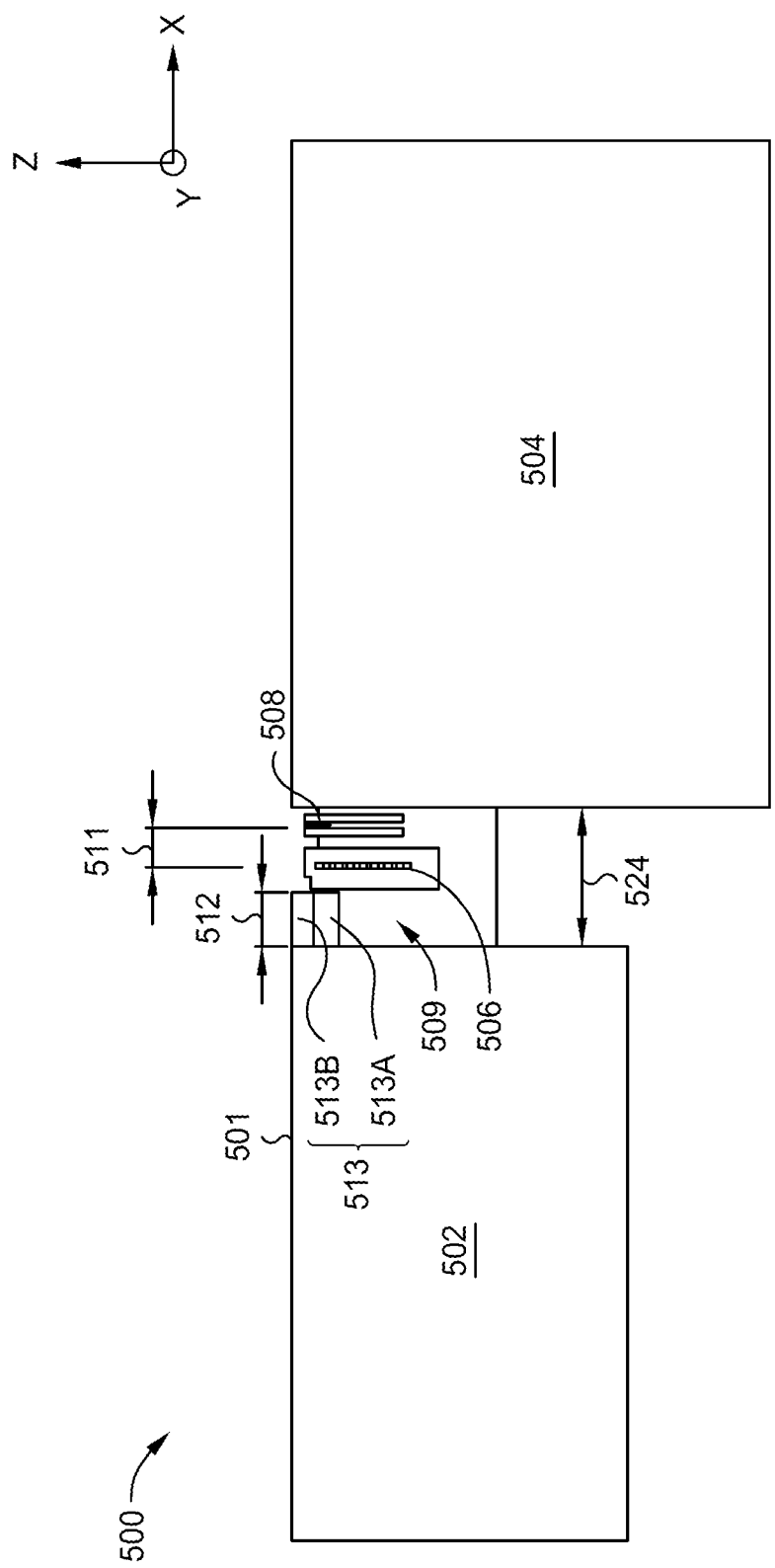
FIG. 5 illustrates a side-view of the module head assembly, according to one implementation.

FIG. 5 illustrates a side-view of the module head assembly 500. The module head assembly 500 may be utilized within a tape drive comprising a controller, such as the tape embedded drive (TED) 100 of FIG. 1 or an LTO based tape drive. The module head assembly 500 may be referred to as a module 500. The module head assembly 500 may be the tape head module 400 of FIG. 4. The module head assembly 500 may be a same-gap verify (SGV) module.

The module 500 comprises a closure 502, one or more write transducers 506 disposed adjacent to the closure 502, one or more read transducers 508 disposed adjacent to the one or more write transducers 506, and a substrate 504 disposed adjacent to the one or more read transducers 508. Each of the one or more write transducers 506 and the one or more read transducers 508 are disposed on the substrate 504. The module 500 has a MFS 501 for facing a tape or other magnetic media, such as the tape 404 of FIG. 4. The write transducer(s) 506 may be referred to as a writer(s) 506, and the read transducer(s) 508 may be referred to as a reader(s) 508.

While only one writer 506 and one reader 508 pair is shown in FIG. 5, the module 500 may comprise a plurality of writer 506 and reader 508 pairs, which may be referred to as a head array. For example, in some embodiments, the module 500 comprises a head array of 16 writers 506 and 16 readers 508, forming 16 writer 506 and reader 508 pairs, along with one or more servo readers (not shown). These writers, readers and servo readers may be formed along the y-direction in the side view of FIG. 5. However, one writer 506 and one reader 508 pair is shown in FIG. 5 for clarity purposes to illustrate the alignment and spacing between each of the writer 506 and reader 508 pairs, as discussed below.

A writer 506 is spaced a distance 511 from a reader 508 of about 5 µm to about 20 µm, in the x-direction. In embodiments comprising a plurality of writer 506 and a plurality of reader 508 pairs, each writer 506 is spaced the distance 511 from an adjacent paired reader 508, in the x-direction. The closure 502 is spaced a distance 524 from the substrate 504 of about 20 µm to about 100 µm. A recessed portion 509 is disposed between the closure 502 and the substrate 504. Other designs and distances are also contemplated.

An overcoat 513 is disposed at least partially within the recessed portion 509 having an overcoat width 512 in the x-direction. The overcoat 513 is disposed between the closure and the writer 506 at least partially filling the recessed portion 509. The overcoat width 512 is about 10% to about 60%, such as about 20% to about 50%, of the distance 524 between the closure 502 and the substrate 504. The overcoat 513, in some embodiments includes an adhesive layer 513A and a protective layer 513B. A thickness in the z-direction of the adhesive layer 513A is about 10% to about 50% of a total thickness of the overcoat 513, such as about 20% to about 30% and a thickness in the z-direction of the protective layer 513B is about 50% to about 90% of the total thickness of the overcoat 513. The overcoat 513 includes a hard material, such as one having a filter cathodic arc (FCA) hardness of about 40 to about 50 GPa, and/or a pulse filter cathodic arc (pFCA) hardness of about 75 GPa to about 85 GPa, or a jet pFCA hardness of about 80 GPa to about 100 GPa. In some embodiments, the adhesive layer 513A includes silicon, such as a silicon nitride (SiNx), CrOx, a-Si, NiCrOx, AlOx, or combination(s) thereof, where x is an integer greater than or equal to 1 (this definition also applies to later instances of x unless indicated otherwise). The adhesive layer 513A can also include a carbon coating. The adhesive layer 513A is deposited to form a low friction interface at the tape bearing surface. In some embodiments, the protective layer 513B is a carbon containing material, an iridium containing material, or a combination thereof. In some embodiments, the overcoat 513 is a single layer composed of a metal oxide such as chromium oxide (CrOx) or titanium oxide (TiOx). In some embodiments, the overcoat 513 is a single layer or a multi-layer coating including Ir, CrOx, TiOx, TiNx, or combination(s) thereof. The overcoat 513 raises a height of a portion of the recessed portion 509 to a height that is substantially coplanar with the media facing surface 501 of the substrate 504 and/or to a surface of the closure 502 interfacing the media.

Figure 6:
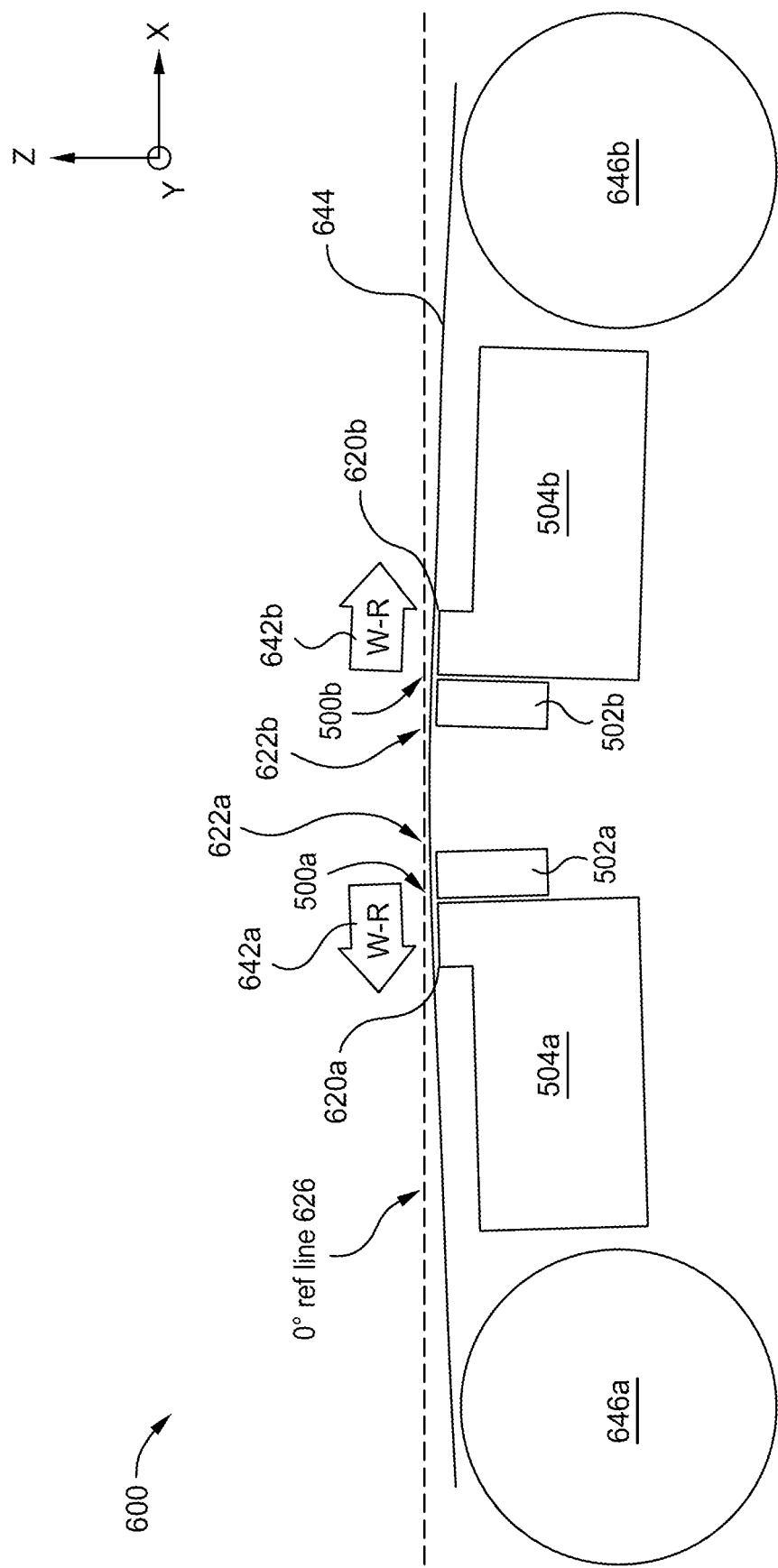
FIG. 6 illustrates a side view of a tape head comprising two module head assemblies, according to one implementation.

FIG. 6 illustrates a side view of a tape head 600 comprising two module head assemblies 500a, 500b, according to one embodiment. The tape head 600 may be the tape head 400 of FIG. 4. The tape head 600 comprises a first module head assembly 500a and a second module head assembly 500b. The first module head assembly 500a may be referred to as a first module 500a, and the second module head assembly 500b may be referred to as a second module 500b. Each of the first and second modules 500a, 500b may be the module 500 of FIG. 5. Each of the first and second modules 500a, 500b may be SGV modules.

The first module 500a comprises a first closure 502a, one or more first writers (not shown) disposed adjacent to the first closure 502a, one or more first readers (not shown) disposed adjacent to the one or more first writers, and a first substrate 504a disposed adjacent to the one or more first readers. Each of the one or more first writers and the one or more first readers are disposed on the first substrate 504a. Similarly, the second module 500b comprises a second closure 502b, one or more second writers (not shown) disposed adjacent to the second closure 502b, one or more second readers (not shown) disposed adjacent to the one or more second writers, and a second substrate 504b disposed adjacent to the one or more second readers. Each of the one or more second writers and the one or more second readers are disposed on the second substrate 504b. The one or more first and second writers may each be the writer 506 of FIG. 5, and the one or more first and second readers may each be the reader 508 of FIG. 5.

In one embodiment, the first module 500a and the second module 500b are arranged in a face-to-face configuration or arrangement such that the first closure 502a of the first module 500a is disposed adjacent to the second closure 502b of the second module 500b. In other words, the first module 500a is a mirror image of the second module 500b, where the second module 500b is a right hand module like that shown in FIG. 5 and the first module 500a is a left hand module. The first module 500a has a first writing and reading direction 642a that is opposite to a second writing and reading direction 642b of the second module 500b.

A MFS of each of the first and second modules 500a, 500b is configured to support a tape 644 or other magnetic media. The tape 644 is configured to move over the first and second modules 500a, 500b using a first guide 646a and a second guide 646b in both the x-direction and the –x-direction. The tape 644 may wrap around a first substrate corner 620a and a first closure corner 622a of the first module 500a, and around a second closure corner 622b and a second substrate corner 620b of the second module 500b, resulting in the tape being bent or angled downwards from a 0° reference line 626 (e.g., parallel to the x-axis) towards the guides 646a, 646b.

Figure 7:
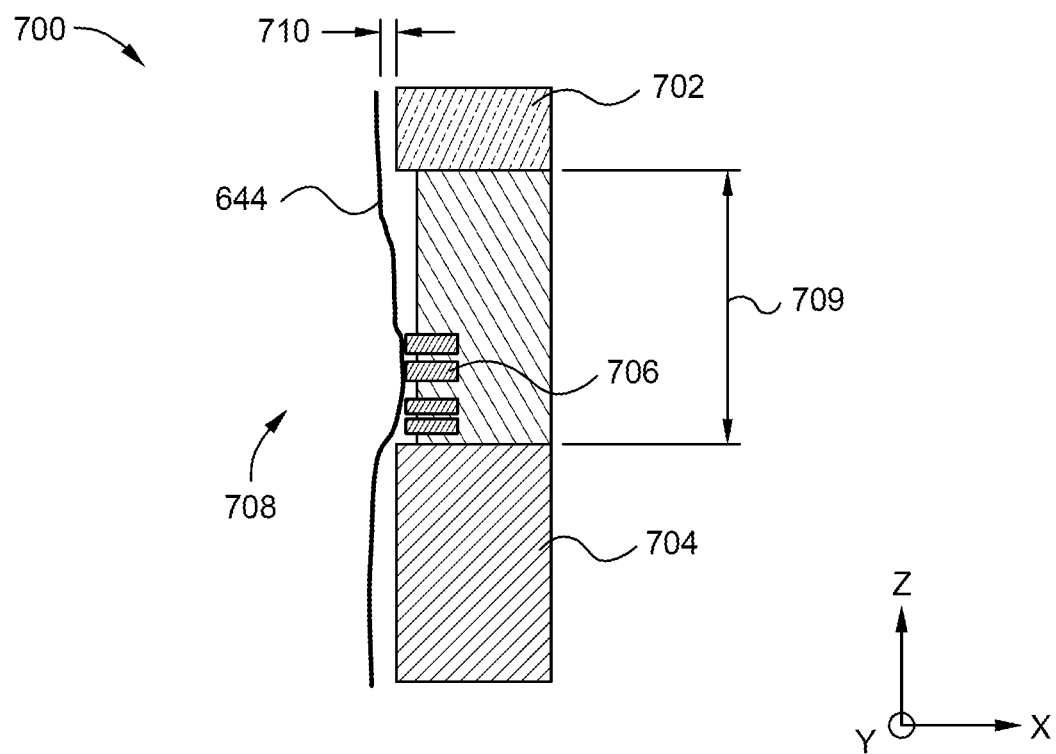
FIG. 7 illustrates a side view of a module head assembly, according to one implementation.

FIG. 7 illustrates a side view of a module head assembly 700 including a closure 702, a substrate 704, and a recessed portion 708 disposed between the closure 702 and the substrate 704. The module head assembly 700 may be used within a tape drive comprising a controller, such as the TED 100 of FIG. 1 or an LTO based tape drive. The module head assembly 700 includes a width 709 along the x-direction between the closure 702 and the substrate 704 of about 25 µm to about 35 µm. Other designs having a different width 709 is also contemplated. The width 709 is the width of the recessed portion 708. An array of transducers 706, such as the write transducers 506 and/or the read transducers 508 of FIG. 5, is disposed within the recessed portion 708. The array of transducers 706 has a width of about 20% to about 60% of the distance 709, such as about 40% to about 50% of the distance 709. A tape 644 or other magnetic media is disposed parallel to the closure 702 and to a media facing surface of the substrate 704. The substrate 704 includes an aluminum-containing material, a titanium-containing material, a carbon-containing material, combination(s) thereof, or alloys thereof. In some embodiments, the substrate 704 includes aluminum-titanium-carbon (AlTiC). Distance 710 is a distance in the z-direction between the tape 644 and an adjacent surface (e.g., a MFS of the array of transducers 706, a MFS of the closure 702, a MFS of the substrate 704). In some embodiments, the distance 710 is zero when the tape 644 contacts the array of transducers 706. Without being bound by theory, it is believed that variability between the tape 644 and the adjacent surface (i.e., distance 710) is increased with increased width 709 of the recessed portion 708. In other words, increasing the width 709 of the recessed portion 708 results in the distance 710 between the tape 644 and the adjacent surface to be more variable along the length of the tape 644.

Figure 8:
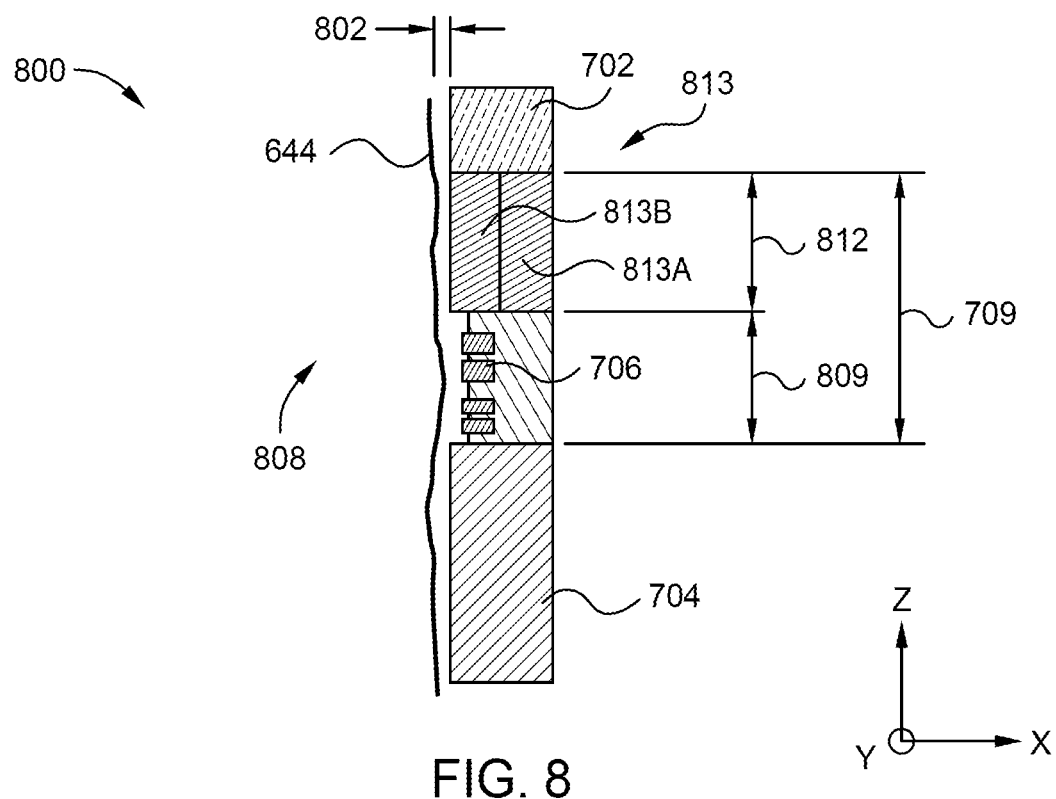
FIG. 8 illustrates a side view of a module head assembly, according to one implementation.

FIG. 8 illustrates a side view of a module head assembly 800 which is substantially the same as the module head assembly 700 of FIG. 7, except an overcoat 813 is disposed at least partially within the recessed portion 808 of the module head assembly 800. The overcoat 813 can be the same as the overcoat 513 described relative to FIG. 5. The overcoat 813 has an overcoat width 812. The overcoat width 812 is about 10% to about 60%, such as about 20% to about 50%, of the width 709 between the closure 702 and the substrate 704 (e.g., the width of the recessed portion 808). The overcoat 813 may be a single layer, or the overcoat 813 may include an adhesive layer 813A and a protective layer 813B. The overcoat 813 is comprises a hard material, such as one having a filter cathodic arc (FCA) hardness of about 40 to about 50 GPa, and/or a pulse filter cathodic arc (pFCA) hardness of about 75 GPa to about 85 GPa, or a jet pFCA hardness of about 80 GPa to about 100 GPa.

In some embodiments, the adhesive layer 813A includes silicon, such as a silicon nitride (SiNx), CrOx, a-Si, NiCrOx, AlOx, or combination(s) thereof. The adhesive layer 813A can also include a carbon coating. In some embodiments, the protective layer 813B is a carbon containing material, an iridium containing material, or a combination thereof.

A thickness of the adhesive layer 813A is about 10% to about 50% of a total thickness of the overcoat 813, such as about 20% to about 30%, and a thickness of the protective layer 813B is about 50% to about 90% of the total thickness of the overcoat 813. In some embodiments, which can be combined with other embodiments described herein, the overcoat 813 is a single layer composed of a metal oxide such as chromium oxide (CrOx). Filling the recessed portion 808 at least partially with the overcoat 813 reduces a width 709 (e.g., the width of the recessed portion 808) to a distance 809, such that the width of the recessed portion 808 is reduced. Without being bound by theory, it is believed that reducing the width of the recessed portion 808 protects the array of transducers 706 by reducing variability of a distance 802 between the tape 644 and adjacent surface (e.g., the MFS of the closure 702, the MFS of the substrate 704, and the MFS of the array of transducers 706). The variability of the distance 802 is reduced relative to the variability of distance 710 shown in FIG. 7. The reduced variability reduces the likelihood of the tape 644 making contact with the array of transducers 706 and thus prevents wear and tear of the array of transducers 706.

Figure 9:
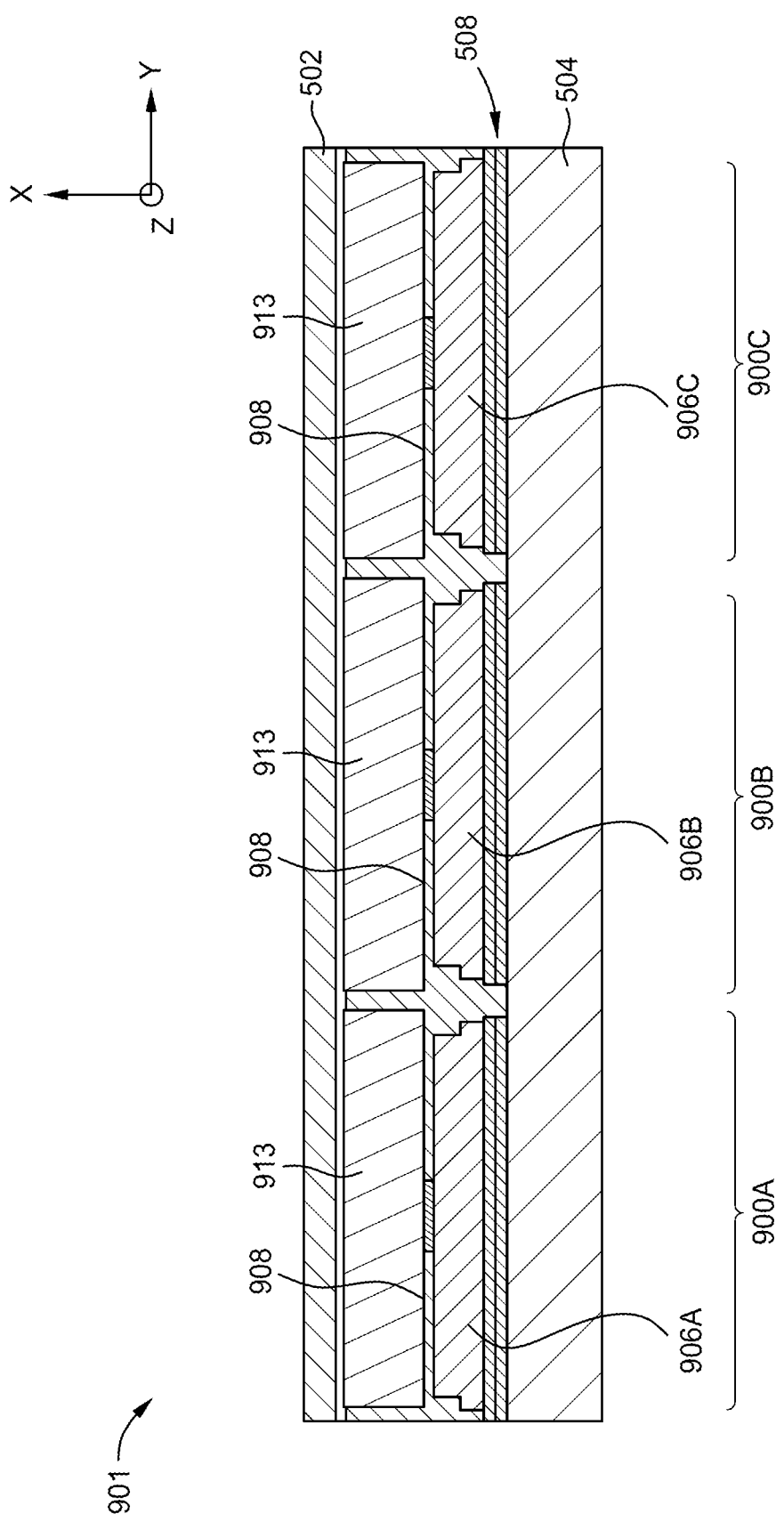
FIG. 9 illustrates a media facing surface view of a tape head, according to one implementation.

FIG. 9 illustrates a media facing surface view of a tape head 901 comprising several module head assemblies 900A, 900B, 900C, according to one embodiment. Each of the module head assemblies 900A, 900B, 900C include an array of transducers 906A, 906B, 906C and recessed portions 908 that are at least partially filled with overcoat 913. The tape head 901 is formed by coating the media facing surface of the tape head 901 with aluminum oxide (e.g., alumina $Al_2O_3$), removing at least a portion of the aluminum oxide coating from the recessed portion 908 of each of the module head assemblies 900A, 900B, 900C, and filling the exposed portion of the recessed portion with the overcoat 913. The overcoat 913 fills a portion of the recessed portion and raises the portion of the recessed portion 908 to a surface that is substantially coplanar with the closure at the MFS. In some embodiments, portions of the aluminum oxide remains exposed after applying the overcoat 913. The overcoat 913 may be a single layer, or the overcoat 913 may include an adhesive layer (e.g., similar to 813A described in FIG. 8) and a protective layer (e.g., similar to 813B described in FIG. 8). The overcoat 913 comprises a hard material, such as a material having a FCA hardness of about 40 to about 50 GPa, a pFCA hardness of about 75 GPa to about 85 GPa, or a jet pFCA hardness of about 80 GPa to about 100 GPa.

In some embodiments, the adhesive layer includes silicon, such as a silicon nitride (SiNx). In some embodiments, the protective layer is a carbon containing material, an iridium containing material, or a combination thereof. A thickness of the adhesive layer is about 10% to about 50% of a total thickness of the overcoat 913, such as about 20% to about 30% and a thickness of the protective layer is about 50% to about 90% of the total thickness of the overcoat 913. In some embodiments, the overcoat 913 is a single layer composed of a metal oxide such as chromium oxide (CrOx). In some embodiments, the length of the overcoat 913 is substantially the same as the length of the array of transducers.

Figure 10:
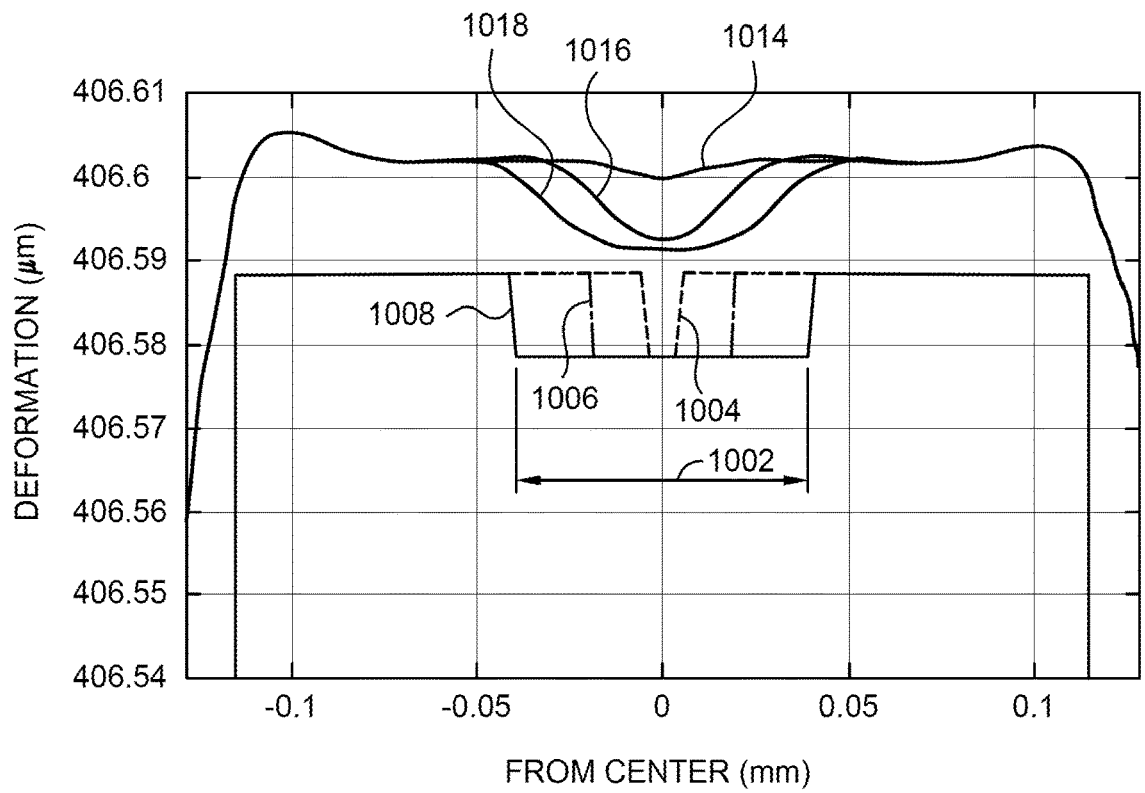
FIG. 10 illustrates a relationship between a gap width of recessed portions having different gap widths, according to some implementations.

FIG. 10 illustrates the relationship between a gap width 1002 of recessed portions having different gap widths 1004, 1006, 1008 between a closure and a substrate of a module head assembly, such as the module head assembly 500 of FIG. 5 or the module head assembly 800 of FIG. 8. Each of the curves shown in FIG. 10 is generated using a mathematical modelling application to illustrate how the tape moves more flatly when the gap is reduced by any coating. Curve 1018 represents a tape position and corresponds to gap width 1008. Curve 1016 represents a tape position and corresponds to gap width 1006. Curve 1014 represents a tape position and corresponds to gap width 1004. The relative deformity is represented on the vertical axis. As can be seen, curve 1018 representing a tape having a largest gap width 1008 of about 0.09 mm to about 0.1 mm has the largest amount of deformity as compared to curves 1016 and 1014. Similarly, curve 1016 having a gap width 1006 of about 0.04 mm to about 0.05 mm has a larger amount of deformity as compared to curve 1004 having a gap width 1004 of about 0.01 mm to about 0.03 mm. Reduced deformity relates to reduced tape bending which protects the writer/reader transducers from wear.

Figure 11:
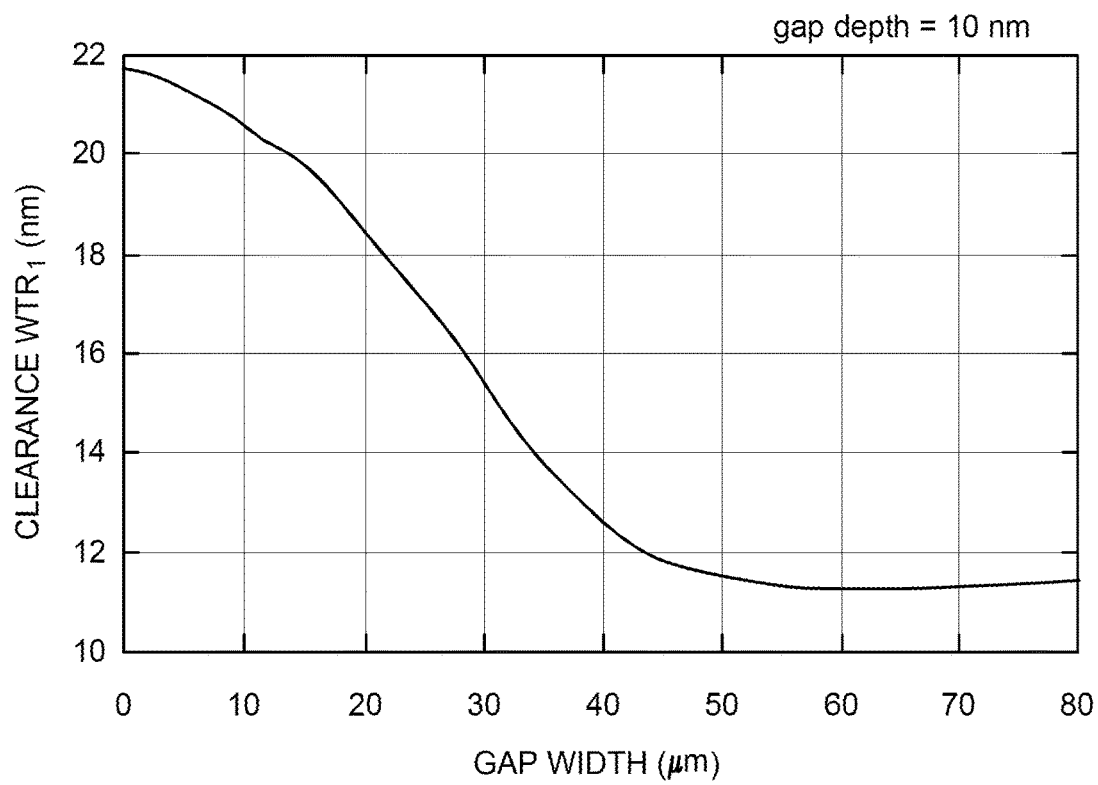
FIG. 11 illustrates a relationship between the gap width of recessed portions to clearance, according to some implementations.

FIG. 11 illustrates the relationship between the gap width 1002 of recessed portions to clearance WTR. At a reduced gap width 1002 (e.g., about 0 μm to about 20 μm), the clearance is high. As the gap width 1002 increases (e.g., greater than about 30 μm), the clearance is low.

By including an overcoat in a recessed portion of the magnetic head assembly adjacent to the closure and the array of transducers, the magnetic media is able to move across the magnetic head assembly with reduced contact with the array of transducers. The overcoat raises at least a portion of the recessed portion to a level that is substantially coplanar with the MFS of the closure. Thus, the magnetic media is more uniform across the magnetic head assembly, reducing deformities of the media. This achieves high recording density and low magnetic spacing. As used herein, "magnetic spacing" refers to spacing between the read and write elements of the recording head and a top of a magnetic recording layer (e.g., uppermost layer) of the tapes. In some aspects, the recording head with the overcoat includes high head/tape interface (HTI) reliability by reducing a closure height with constant spacing.

In one embodiment, a magnetic recording head assembly is provided and is configured to read from and write to a magnetic media. The head assembly includes a first module having a first media facing surface (MFS), a first closure, and a first recessed portion disposed between the first MFS and the first closure. The first MFS includes AlTiC. A second module is provided having a second MFS, a second closure, and a second recessed portion disposed between the second MFS and the second closure. The second MFS includes AlTiC. An overcoat includes an adhesive layer and a protective layer disposed within each of the first and second recessed portions.

The first recessed portion comprises a first array of transducers and the second recessed portion comprises a second array of transducers. The overcoat is disposed adjacent to the first array of transducers and adjacent to the second array of transducers. The adhesive layer comprises silicon, such as silicon nitride (SiNx). The protective layer is a carbon containing material, an iridium containing material, or a combination thereof. A thickness of the adhesive layer is about 10% to about 50% of a total thickness of the overcoat, such as about 20% to about 30%, and a thickness of the protective layer is about 50% to about 90% of the total thickness of the overcoat. The first recessed portion comprises a first height and the second recessed portion comprises a second height. One or both of the first and second heights are substantially the same as the total thickness of the overcoat. The first height is about 30 Angstroms to about 100 Angstroms. A magnetic recording device comprising the magnetic recording head assembly is provided.

In another embodiment, a magnetic recording head assembly is provided and configured to read from and write to a magnetic media. The head assembly includes a first module comprising a first head having a first media facing surface (MFS), a first closure, a first recessed portion disposed between the first MFS and the first closure, and a first array of transducers. A second module includes a second head having a second MFS, a second closure, a second recessed portion disposed between the second MFS and the second closure, and a second array of transducers. An overcoat including a metal is disposed within each of the first and second recessed portions, the overcoat disposed in each recessed portion in an area apart from the first and second array of transducers.

The overcoat comprises a material selected from CrOx, iridium, or a combination thereof. The overcoat comprises a thickness of about 30 Angstroms to about 100 Angstroms. An alumina material is disposed within the first and second recessed portion. The first and second closures each comprises AlTiC. The overcoat is disposed adjacent to the first closure. The first recessed portion comprises a first width between the first closure and the first head, and wherein the first width is about 20 μm to about 40 μm. About 10% to about 60% of the first width comprises the overcoat. A magnetic recording device comprising the magnetic recording head assembly is provided.

In another embodiment, a data storage device is provided having a magnetic recording head assembly configured to read from and write to a magnetic media. The assembly includes a module comprising a media facing surface (MFS), a closure, a recessed portion disposed between the MFS and the closure, and an array of transducers. An overcoat is disposed within the recessed portion and adjacent to the array of transducers. The data storage device is a tape drive.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head assembly configured to read from and write to a magnetic media, the head assembly comprising:
    a first module comprising:
        a first media facing surface (MFS), the first MFS comprising AlTiC;
        a first closure disposed at the first MFS;
        a first substrate disposed at the first MFS;
        a first recessed portion disposed between the first substrate and the first closure, the first recessed portion being recessed from the first MFS; and
        a first array of transducers disposed in the first recessed portion, the first array of transducers being recessed from the first MFS;
    a second module comprising:
        a second MFS, the second MFS comprising AlTiC;
        a second closure disposed at the second MFS;
        a second substrate disposed at the second MFS;
        a second recessed portion disposed between the second substrate and the second closure, the second recessed portion being recessed from the second MFS; and
        a second array of transducers disposed in the second recessed portion, the second array of transducers being recessed from the second MFS; and
    an overcoat comprising an adhesive layer and a protective layer disposed within each of the first and second recessed portions, wherein the overcoat disposed within each of the first and second recessed portions is disposed in a same plane as the first MFS of the first closure and the first substrate and the second MFS of the second closure and the second substrate.

2. The magnetic recording head assembly of claim 1, wherein the overcoat is disposed adjacent to the first array of transducers and adjacent to the second array of transducers.

3. The magnetic recording head assembly of claim 1, wherein the adhesive layer comprises silicon.

4. The magnetic recording head assembly of claim 1, wherein the adhesive layer comprises SiNx.

5. The magnetic recording head assembly of claim 1, wherein the protective layer is a carbon containing material, an iridium containing material, a titanium containing material, a chromium containing material, or a combination thereof.

6. The magnetic recording head assembly of claim 1, wherein a thickness of the adhesive layer is about 20% to about 50% of a total thickness of the overcoat and a thickness of the protective layer is about 50% to about 90% of the total thickness of the overcoat.

7. The magnetic recording head assembly of claim 6, wherein the first recessed portion comprises a first height and the second recessed portion comprises a second height, wherein one or both of the first and second heights are substantially the same as the total thickness of the overcoat.

8. The magnetic recording head assembly of claim 7, wherein the first height is about 30 Angstroms to about 100 Angstroms.

9. A magnetic recording device comprising a magnetic recording head assembly configured to read from and write to a magnetic media, the head assembly comprising:
    a first module comprising:
        a first media facing surface (MFS), the first MFS comprising AlTiC;
        a first closure disposed at the first MFS;
        a first substrate disposed at the first MFS;

a first recessed portion disposed between the first substrate and the first closure, the first recessed portion being recessed from the first MFS; and a first array of transducers disposed in the first recessed portion, the first array of transducers being recessed from the first MFS;

a second module comprising:

a second MFS, the second MFS comprising AlTiC;

a second closure disposed at the second MFS;

a second substrate disposed at the second MFS;

a second recessed portion disposed between the second substrate and the second closure, the second recessed portion being recessed from the second MFS; and a second array of transducers disposed in the second recessed portion, the second array of transducers being recessed from the second MFS; and an overcoat comprising an adhesive layer and a protective layer disposed within each of the first and second recessed portions, wherein the overcoat disposed within each of the first and second recessed portions is disposed in a same plane as the first MFS of the first closure and the first substrate and the second MFS of the second closure and the second substrate.

10. A magnetic recording head assembly configured to read from and write to a magnetic media, the head assembly comprising:

a first module comprising:

a first head having a first media facing surface (MFS);

a first closure disposed at the first MFS;

a first substrate disposed at the first MFS;

a first recessed portion disposed between the first substrate and the first closure, the first recessed portion being recessed from the first MFS; and a first array of transducers recessed from the first MFS;

a second module comprising:

a second head having a second MFS;

a second closure disposed at the second MFS;

a second substrate disposed at the second MFS;

a second recessed portion disposed between the second substrate and the second closure, the second recessed portion being recessed from the second MFS; and a second array of transducers recessed from the second MFS; and an overcoat comprising a metal within each of the first and second recessed portions, the overcoat disposed in each recessed portion in an area apart from the array of transducers, wherein the overcoat disposed in each recessed portion is disposed in a same plane as the first MFS of the first closure and the first substrate and the second MFS of the second closure and the second substrate.

11. The magnetic recording head assembly of claim 10, wherein the overcoat comprises a material selected from CrOx, iridium, TiOx, TiNx, or a combination thereof.

12. The magnetic recording head assembly of claim 10, wherein the overcoat comprises a thickness of about 30 Angstroms to about 100 Angstroms.

13. The magnetic recording head assembly of claim 10, further comprising an alumina material disposed within the first and second recessed portion.

14. The magnetic recording head assembly of claim 10, wherein the first and second closures each comprises AlTiC.

15. The magnetic recording head assembly of claim 10, wherein the overcoat is disposed adjacent to the first closure.

16. The magnetic recording head assembly of claim 10, wherein the first recessed portion comprises a first width between the first closure and the first head, and wherein the first width is about 20 µm to about 40 µm.

17. The magnetic recording head assembly of claim 16, wherein about 10% to about 60% of the first width comprises the overcoat.

18. A magnetic recording device comprising a magnetic recording head assembly configured to read from and write to a magnetic media, the head assembly comprising:

a first module comprising:

a first head having a first media facing surface (MFS);

a first closure disposed at the first MFS;

a first substrate disposed at the first MFS;

a first recessed portion disposed between the first substrate and the first closure, the first recessed portion being recessed from the first MFS; and a first array of transducers recessed from the first MFS;

a second module comprising:

a second head having a second MFS;

a second closure disposed at the second MFS;

a second substrate disposed at the second MFS;

a second recessed portion disposed between the second substrate and the second closure, the second recessed portion being recessed from the second MFS; and a second array of transducers recessed from the second MFS; and an overcoat comprising a metal within each of the first and second recessed portions, the overcoat disposed in each recessed portion in an area apart from the array of transducers, wherein the overcoat disposed in each recessed portion is disposed in a same plane as the first MFS of the first closure and the first substrate and the second MFS of the second closure and the second substrate.

19. A data storage device, comprising:

a magnetic recording head assembly configured to read from and write to a magnetic media, the assembly comprising:

a module comprising:

a media facing surface (MFS);

a closure disposed at the MFS;

a substrate disposed at the MFS;

a recessed portion disposed between the substrate and the closure; and an array of transducers recessed from the MFS; and an overcoat disposed within the recessed portion and adjacent to the array of transducers, the overcoat being disposed in a same plane as the MFS of the closure and substrate.

20. The data storage device of claim 19, wherein the data storage device is a tape drive.

21. The data storage device of claim 19, wherein the overcoat is disposed adjacent to the closure.

22. The data storage device of claim 19, wherein the overcoat comprises an adhesive layer and a protective layer.

* * * * *